US012703276B2

(12) United States Patent
Runde et al.

(10) Patent No.: US 12,703,276 B2
(45) Date of Patent: Aug. 11, 2026

(54) MULTI-FUNCTION REAR SEAT STRUCTURE WITH STOW TO FLOOR

(71) Applicant: MAGNA SEATING INC., Aurora (CA)

(72) Inventors: David M. Runde, Ortonville, MI (US); Kristof M. Kurzeja, Commerce Township, MI (US)

(73) Assignee: MAGNA SEATING INC., Aurora (CA)

( * ) Notice: Subject to any disclaimer, the term of this patent is extended or adjusted under 35 U.S.C. 154(b) by 207 days.

(21) Appl. No.: 18/696,278

(22) PCT Filed: Oct. 27, 2022

(86) PCT No.: PCT/US2022/048032
§ 371 (c)(1),
(2) Date: Mar. 27, 2024

(87) PCT Pub. No.: WO2023/076480
PCT Pub. Date: May 4, 2023

(65) Prior Publication Data

US 2025/0001918 A1 Jan. 2, 2025

Related U.S. Application Data

(60) Provisional application No. 63/272,390, filed on Oct. 27, 2021.

(51) Int. Cl.
*B60N 2/30* (2006.01)

(52) U.S. Cl.
CPC .......... *B60N 2/3075* (2013.01); *B60N 2/3011* (2013.01); *B60N 2/3045* (2013.01)

(58) Field of Classification Search
CPC .. B60N 2/3075; B60N 2/3077; B60N 2/3009; B60N 2/3011; B60N 2/3013; B60N 2/6045; B60N 2/3059
See application file for complete search history.

(56) References Cited

U.S. PATENT DOCUMENTS 7,255,384 B2 8/2007 Saberan et al.
7,559,594 B2 7/2009 Mcmillen
(Continued)

FOREIGN PATENT DOCUMENTS

FR 2915936 A3 11/2008
JP 2000-189266 A2 7/2000
WO WO2017047157 A1 3/2017

*Primary Examiner* — Chi Q Nguyen
(74) *Attorney, Agent, or Firm* — Miller Canfield

(57) ABSTRACT

A vehicle seat assembly is movable between a use position, a stadium position, a recline/slouch position, and a stow to floor position. The seat assembly includes a seat cushion, a seat back pivotally coupled to the seat cushion, a fore/aft adjuster having a lower channel fixed to the vehicle floor and an upper channel slidably coupled to the lower channel, a pivot support bracket fixedly coupled to the upper channel, a stow to floor bracket having a lower end pivotally coupled to the pivot support bracket by a stow pivot and an upper end pivotally coupled to the seat cushion by a stadium pivot. The stow pivot is spaced vertically below the upper channel of the fore/aft adjuster. The seat cushion and the seat back fold and articulate to the stow to floor position by rotating about the stow pivot and stadium pivot.

10 Claims, 11 Drawing Sheets

(56) References Cited

U.S. PATENT DOCUMENTS

| | | | | |
|---|---|---|---|---|
| 7,611,200 | B2 | 11/2009 | Jovicevic et al. | |
| 8,662,561 | B2 | 3/2014 | Runde et al. | |
| 8,985,692 | B2 | 3/2015 | Pacolt | |
| 9,604,552 | B2 | 3/2017 | Akutsu et al. | |
| 10,086,792 | B1 * | 10/2018 | Watanabe | B60N 2/688 |
| 10,589,642 | B2 * | 3/2020 | Handigol | B60N 2/1615 |
| 10,618,437 | B2 * | 4/2020 | Fukawatase | B60R 22/26 |
| 10,899,250 | B2 * | 1/2021 | Aktas | B60N 2/14 |
| 11,524,609 | B2 * | 12/2022 | Ghalsasi | B60N 2/2209 |
| 11,618,351 | B2 * | 4/2023 | Kim | B60N 2/36<br>297/362 |
| 11,794,619 | B2 * | 10/2023 | Baba | B60N 2/427 |
| 11,897,371 | B2 * | 2/2024 | Kim | B60N 2/68 |
| 2004/0051361 | A1 * | 3/2004 | Rausch | B60N 2/0715<br>297/341 |
| 2004/0100115 | A1 | 5/2004 | Rhodes et al. | |
| 2012/0139315 | A1 * | 6/2012 | Yamada | B60N 2/682<br>297/354.1 |
| 2013/0187430 | A1 * | 7/2013 | Watanabe | B60N 2/682<br>297/452.19 |
| 2013/0221725 | A1 * | 8/2013 | Yamada | B60N 2/682<br>297/452.18 |
| 2020/0101873 | A1 * | 4/2020 | Cluet | B60N 2/3011 |
| 2021/0331608 | A1 | 10/2021 | Tanaka et al. | |

* cited by examiner 10
122
14
24
28
82
124
12
22
26
16
20
18
50

10
122
14
28
82
22
124
24
26
18
78
50
12

MULTI-FUNCTION REAR SEAT STRUCTURE WITH STOW TO FLOOR

CROSS-REFERENCE TO RELATED APPLICATION

This application claims priority to and all the benefits of U.S. Provisional Application 63/272,390, filed on Oct. 27, 2021, the disclosure of which is hereby incorporated by reference in its entirety.

BACKGROUND OF THE INVENTION

1. Field of the Invention

The present invention relates to a seat assembly for an automotive vehicle. More particularly, the present invention relates to a rear seat assembly for an automotive vehicle that is selectively movable between a use position, a stadium position, a recline/slouch position, and a stow to floor position.

2. Description of Related Art

It is common for automotive vehicles, for example pick-up trucks, to have passenger cabins with one or more rear seat assemblies. The rear seat assemblies are positioned between a row of front seat assemblies and a rear wall of the cabin. It is desirable to provide both passenger comfort for occupants using the rear seat assemblies and to provide maximum storage capacity within the cabin when there are no occupants or only one occupant using the rear seat assemblies. There has been continual improvement by several manufacturers that have developed seat designs with both objectives in mind. However, there is still customer demand for increased seat adjustment capabilities.

SUMMARY OF THE INVENTION

Therefore, there is a need for a vehicle seat that is adjustable to provide passenger comfort and that has increased seat adjustment capabilities allowing for maximum storage space when there are no passengers or only one passenger occupying the rear seat assemblies.

The current invention satisfies these needs by configuring a vehicle seat that folds and stows near the floor of the vehicle. According to one embodiment of the invention, a seat assembly for an automotive vehicle includes a seat cushion and a seat back pivotally coupled to the seat cushion by a recline pivot, wherein the seat back pivots about the recline pivot between an upright position, a recline position, and a fold-over position, a fore/aft adjuster that has a lower channel that is fixedly coupled to the floor of the automotive vehicle and an upper channel that is slidably coupled to the lower channel having a range of motion between a full-rear position when the upper channel is fully retracted with respect to the lower channel and a full-forward position when the upper channel is fully extended with respect to the lower channel, a pivot support bracket that is fixedly coupled to the upper channel, and a stow to floor bracket that has a lower end pivotally coupled to the pivot support bracket by a stow pivot and an upper end pivotally coupled to the cushion frame by a stadium pivot. The seat cushion selectively engages with the pivot support bracket. The stow pivot defines a stow pivot axis that is spaced vertically below the upper channel of the fore/aft adjuster.

Other objects and purposes of the invention, and variations thereof, will be apparent upon reading the following specification and inspecting the accompanying drawings.

BRIEF DESCRIPTION OF THE DRAWINGS

Advantages of the present invention will be readily appreciated as the same becomes better understood by reference to the following detailed description when considered in connection with the accompanying drawings, wherein.

Figure 2:
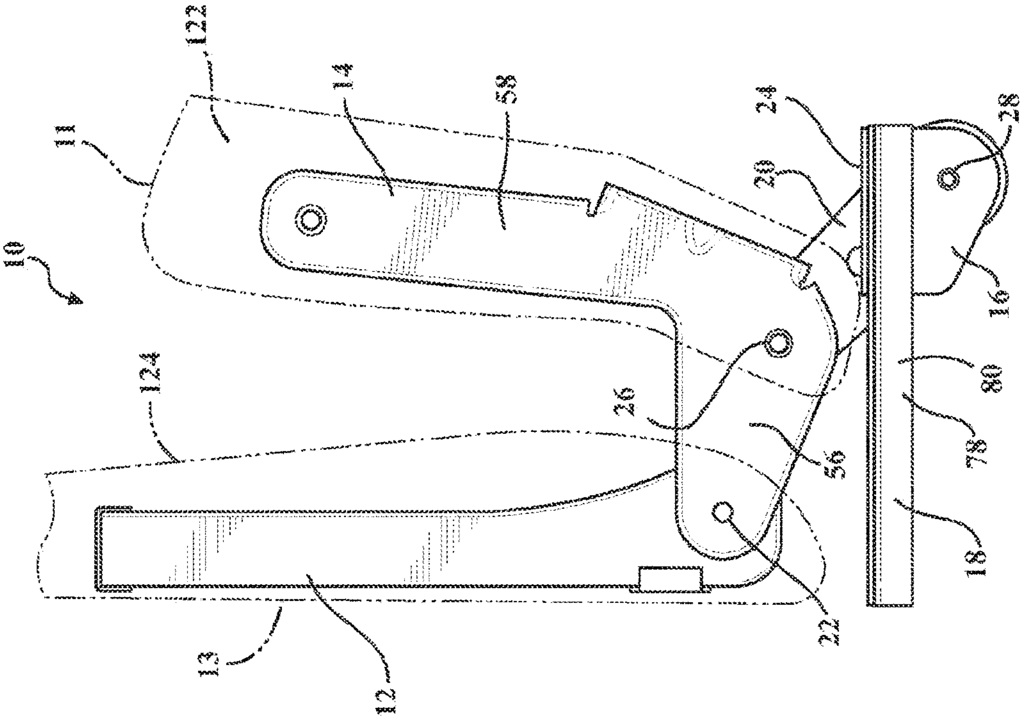
FIG. 2 is a side view of the seat assembly in a stadium position.

Certain terminology will be used in the following description for convenience and reference only and will not be limiting. For example, the words “upwardly”, “downwardly”, “rearwardly” and “forwardly” will refer to directions in the drawings to which reference is made. The words “inwardly” and “outwardly” will refer to directions toward and away from, respectively, the geometric center of the arrangement and designated parts thereof. The terminology will include the words specifically mentioned, derivatives thereof, and words of similar import.

DETAILED DESCRIPTION OF THE EMBODIMENTS

Referring to the Figures, wherein like numerals indicate like or corresponding parts throughout the several views, a seat assembly according to one embodiment of the invention for use in an automotive vehicle is shown generally at 10. Referring to FIGS. 1-5, the seat assembly 10 includes a generally horizontal seat cushion 11 and a generally upright seat back 13 operatively coupled to the seat cushion 11 by recline pivot 22. The seat cushion 11 includes a cushion frame 14 for supporting a cellular foam pad 122 encased by a trim cover as is commonly known in the art. Similarly, the seat back 13 includes a back frame 12 for supporting a cellular foam pad 124 encased by a trim cover. The seat assembly is repositionable between a use position (shown in FIG. 1), a stadium position (shown in FIG. 2), a recline/slouch position (shown in FIG. 3), and a stow to floor position (shown in FIG. 4).

Figure 3:
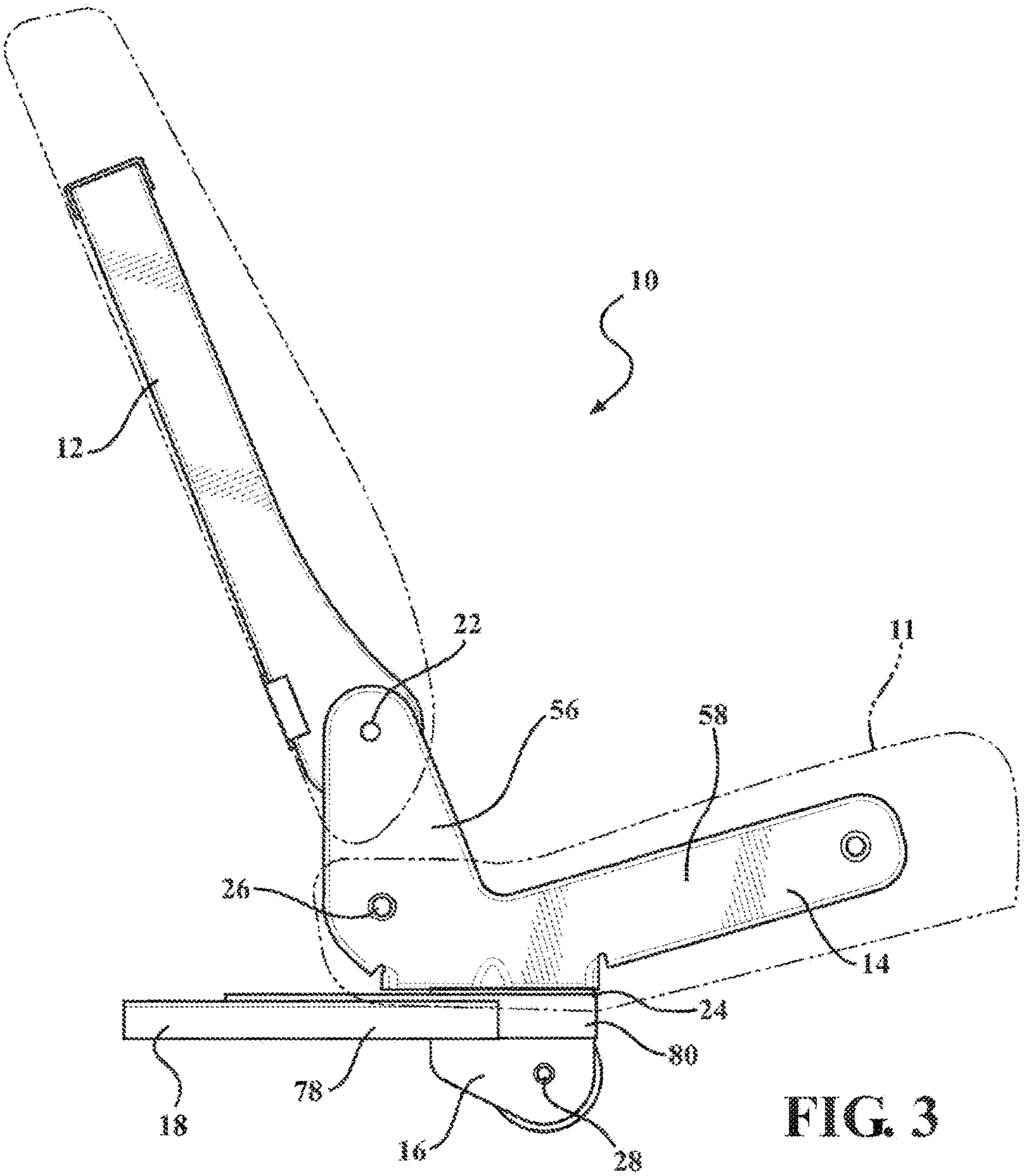
FIG. 3 is a side view of the seat assembly in a recline/slouch position.
Figure 4:
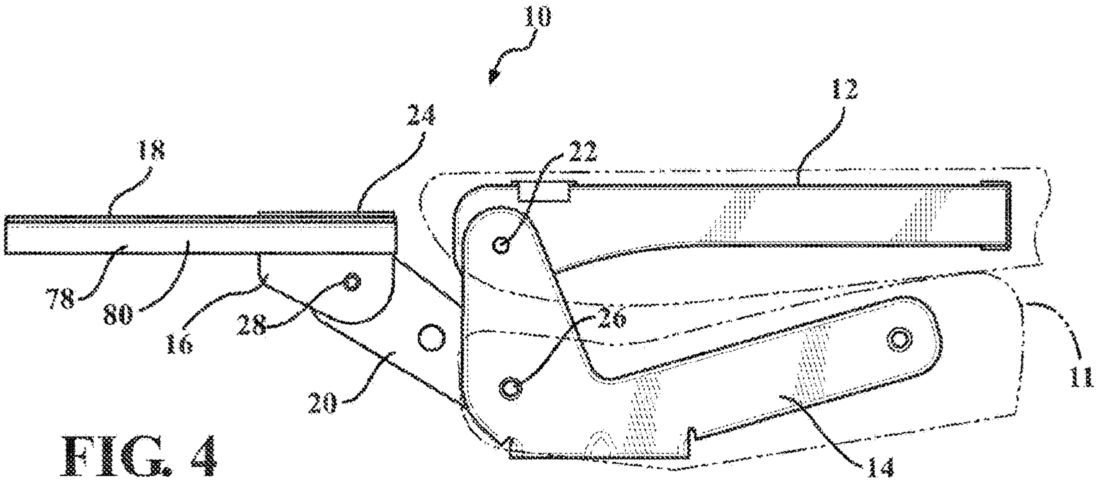
FIG. 4 is a side view of the seat assembly in a stow to floor position.
Figure 5:
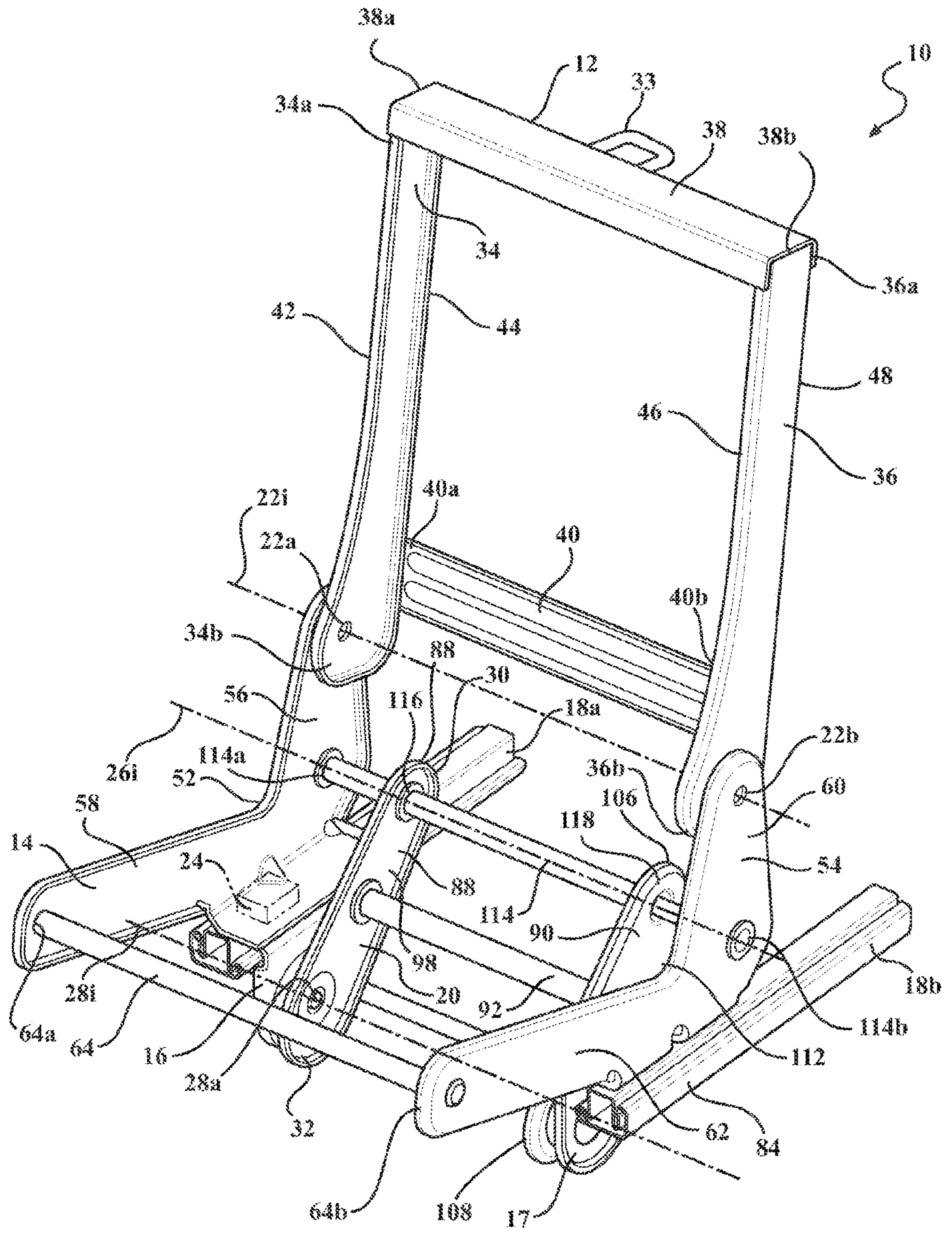
FIG. 5 is a perspective view of the seat assembly in the use position.

Referring to FIGS. 1-5 and 9, the seat assembly 10 is supported above a vehicle floor 82 by a pair of spaced apart fore/aft adjusters 18. A pivot support bracket 16 is fixedly coupled to the fore/aft adjusters 18. Referring to FIG. 5, the cushion frame 14 is optionally selectively latched to the pivot support bracket 16 by a latch 24. An upper end 30 of a stow to floor bracket 20 is pivotally coupled to the cushion frame 14 by a stadium pivot 26. A lower end 32 of the stow to floor bracket 20 is pivotally coupled to the pivot support bracket 16 by a stow pivot 28. The back frame 12 optionally includes a high latch 33.

In one embodiment, the back frame 12 is a generally rectangular shaped frame having a first member 34, a second member 36, a top member 38, and a bottom member 40. The first member 34 and the second member 36 are positioned generally parallel to each other and each have a first end 34*a*, 36*a* and a second end 34*b*, 36*b*. The cross-section of the first member 34 has a depth dimension defined by a front edge 42 and a rear edge 44. The first end 34*a* of the first member 34 has a straight edge that extends between the front edge 42 and the rear edge 44. The second end 34*b* of the first member 34 has a rounded edge that extends between the front edge 42 and the rear edge 44. The cross section of the second member 36 is a mirror image of the first member 34 and, also, has a depth dimension defined by a front edge 46 and a rear edge 48. The first end 36*a* of the second member 36 has a straight edge that extends between the front edge 46 and the rear edge 48. The second end 36*b* of the second member 36 has a rounded edge that extends between the front edge 46 and the rear edge 48.

The top member 38 extends between and is perpendicular to the first member 34 and the second member 36. The top member 38 has a first end 38*a* that is rigidly attached to the first end 34*a* of the first member 34 and a second end 38*b* that is rigidly attached to the first end 36*a* of the second member 36. The top member 38 is attached near or at the boundary of the first ends 34*a*, 36*a* of the first and second members 34, 36. Optionally, there can be a high latch 33 attached to the top member 38 that facilitates securing the back frame 12 to the interior rear wall 50 of the cabin. The high latch 33 can be a fixed back frame latch with an articulating striker, a "sliding" back frame latch with a fixed striker, or a vehicle-mounted latch with a seat-mounted striker. Alternatively, if there is no high latch 33 because it is a free-standing seat, there could be an engagement feature on the rear wall 50 to allow the stadium function. One example of a high latch 33 to facilitate securing the seat back 13 to the rear wall 50 of the vehicle cabin is shown in U.S. Pat. No. 8,662,561, the disclosure of which is incorporated by reference herein in its entirety.

Similarly, the bottom member 40 of back frame 12 extends between and is perpendicular to the first member 34 and the second member 36. The bottom member 40 has a first end 40*a* that is rigidly attached near the second end 34*b* of the first member 34 and a second end 40*b* that is rigidly attached near the second end 36*b* of the second member 36. The bottom member 40 is attached to the rear edge 44 of the first member 34 and the rear edge 48 of the second member 36 spaced inwardly from the boundaries of the second ends 34*b*, 36*b* of the first and second members 34, 36.

The cushion frame 14 has a first member 52 and a second member 54 that are both generally L-shaped. The first member 52 of the cushion frame 14 has a first section 56 that is generally shorter than a second section 58. Similarly, the second member 54 of the cushion frame 14 has a first section 60 that is generally shorter than a second section 62. The first member 52 and the second member 54 are positioned generally parallel to each other and mirror each other. There is a crossmember 64 that extends between the first member 52 and the second member 54 and is attached to both the first member 52 and the second member 54. The crossmember 64 has a first end 64*a* and a second end 64*b*. The first end 64*a* of the crossmember 64 is rigidly attached near the end of the second section 58 of the first member 52 of the cushion frame 14. Similarly, the second end 64*b* of the crossmember 64 is rigidly attached near the end of the second section 62 of the second member 54 of the cushion frame 14.

The cushion frame 14 is pivotally coupled to the back frame 12 by a recline pivot 22. The recline pivot 22 includes two pivot points 22*a*, 22*b* that define a recline pivot axis 22*i* that extends between the two pivot points 22*a*, 22*b*. The first pivot point 22*a* is located near the second end 34*b* of the first member 34 of the back frame 12 and near the end of the first section 56 of the first member 52 of the cushion frame 14. Similarly, the second pivot point 22*b* is located near the second end 36*b* of the second member 36 of the back frame 12 and near the end of the first section 60 of the second member 54 of the cushion frame 14. The recline pivot 22 can be a free pivot, a latched pivot, a disc recliner pivot, or a power mechanism, all as known in the art. An example of a disc recliner is shown in U.S. Publication 2022/0185152, the disclosure of which is incorporated by reference herein in its entirety.

Figure 6:
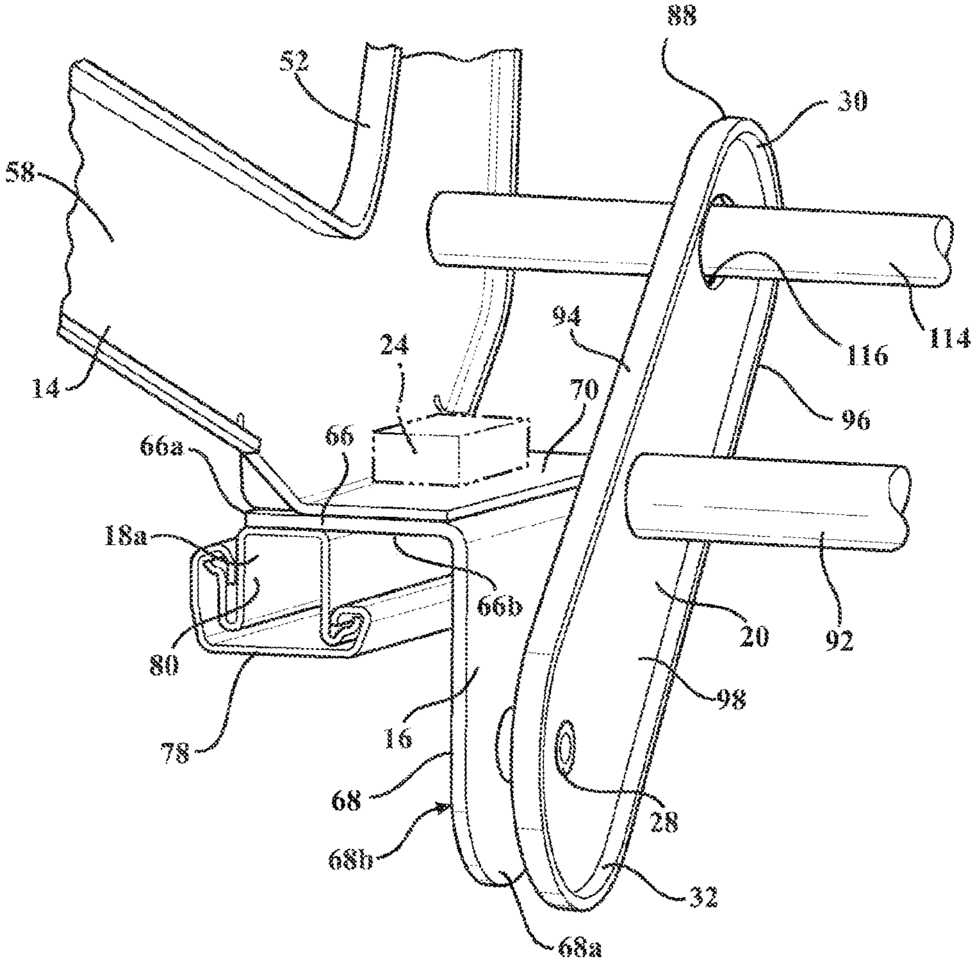
FIG. 6 is fragmentary perspective view of the seat assembly in the use position.

There are two pivot support brackets, a first pivot support bracket 16 and a second pivot support bracket 17. The pivot support brackets 16, 17 are also referred to as B-brackets. Each pivot support bracket 16, 17 has a generally L-shaped cross section when viewed from the front of the seat assembly 10. Referring to FIG. 6, the first pivot support bracket 16 has a first section 66 and a second section 68. The first section 66 is positioned generally horizontally and has an upper surface 66*a* and a lower surface 66*b*. The upper surface 66*a* releasably attaches to a flange 70 that is on the second, longer section 58 of the first member 52 of the cushion frame 14. In one embodiment, a latch 24 selectively couples the cushion frame 14 to the pivot support bracket 16. The lower surface 66*b* of the first section 66 is rigidly attached to the fore/aft adjuster 18. The second section 68 of the first pivot support bracket 16 is positioned generally vertically and extends downwardly from the first section 66. The second section 68 has an inside surface 68*a* and an outside surface 68*b*.

Figure 7:
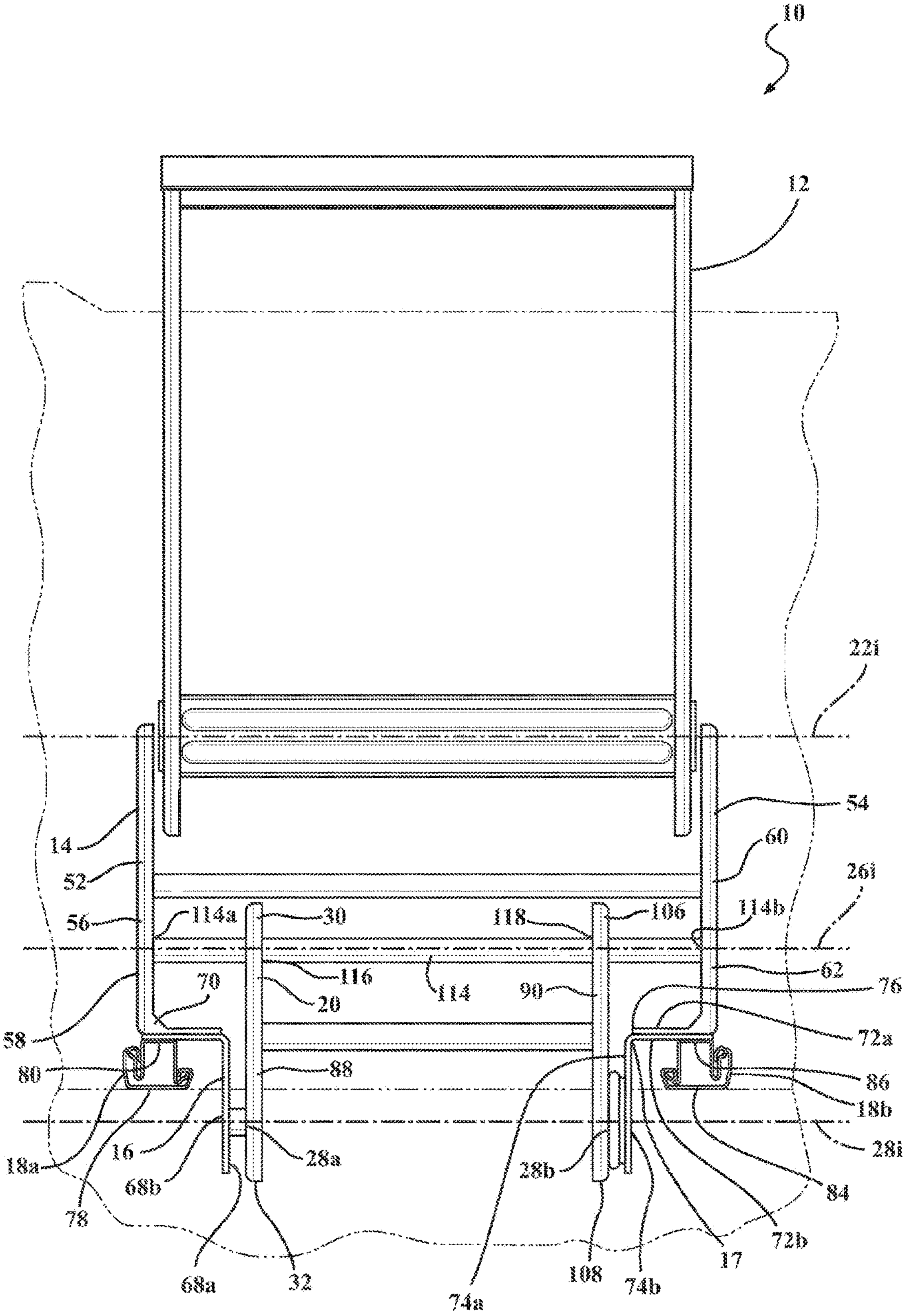
FIG. 7 is a front view of the seat assembly in the use position within the vehicle cabin.

Referring to FIG. 7, the second pivot support bracket 17 is a mirror image of the first pivot support bracket 16. The second pivot support bracket 17 has a first section 72 and a second section 74. The first section 72 is positioned generally horizontally and has an upper surface 72*a* and a lower surface 72*b*. The upper surface 72*a* releasably attaches to a flange 76 that is on the second, longer section 62 of the second member 54 of the cushion frame 14. In one embodiment, a latch selectively couples the cushion frame second member 54 to the second pivot support bracket 17, similar to latch 24. The lower surface 72*b* of the first section 72 is rigidly attached to the fore/aft adjuster 18. The second section 74 of the second pivot support bracket 17 is positioned generally vertically and extends downwardly from the first section 72. The second section 74 has an inside surface 74*a* and an outside surface 74*b*.

Figure 1:
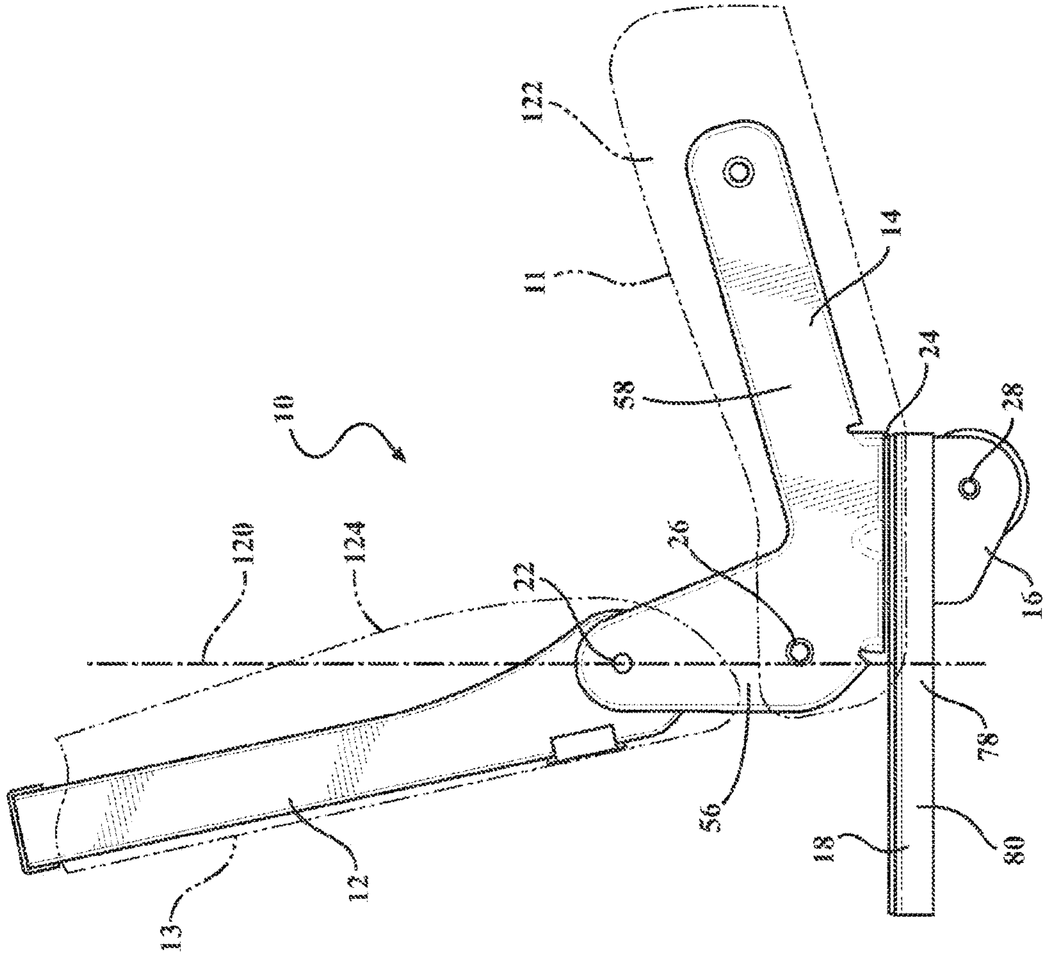
FIG. 1 is a side view of a seat assembly in a use position.
Figure 8:
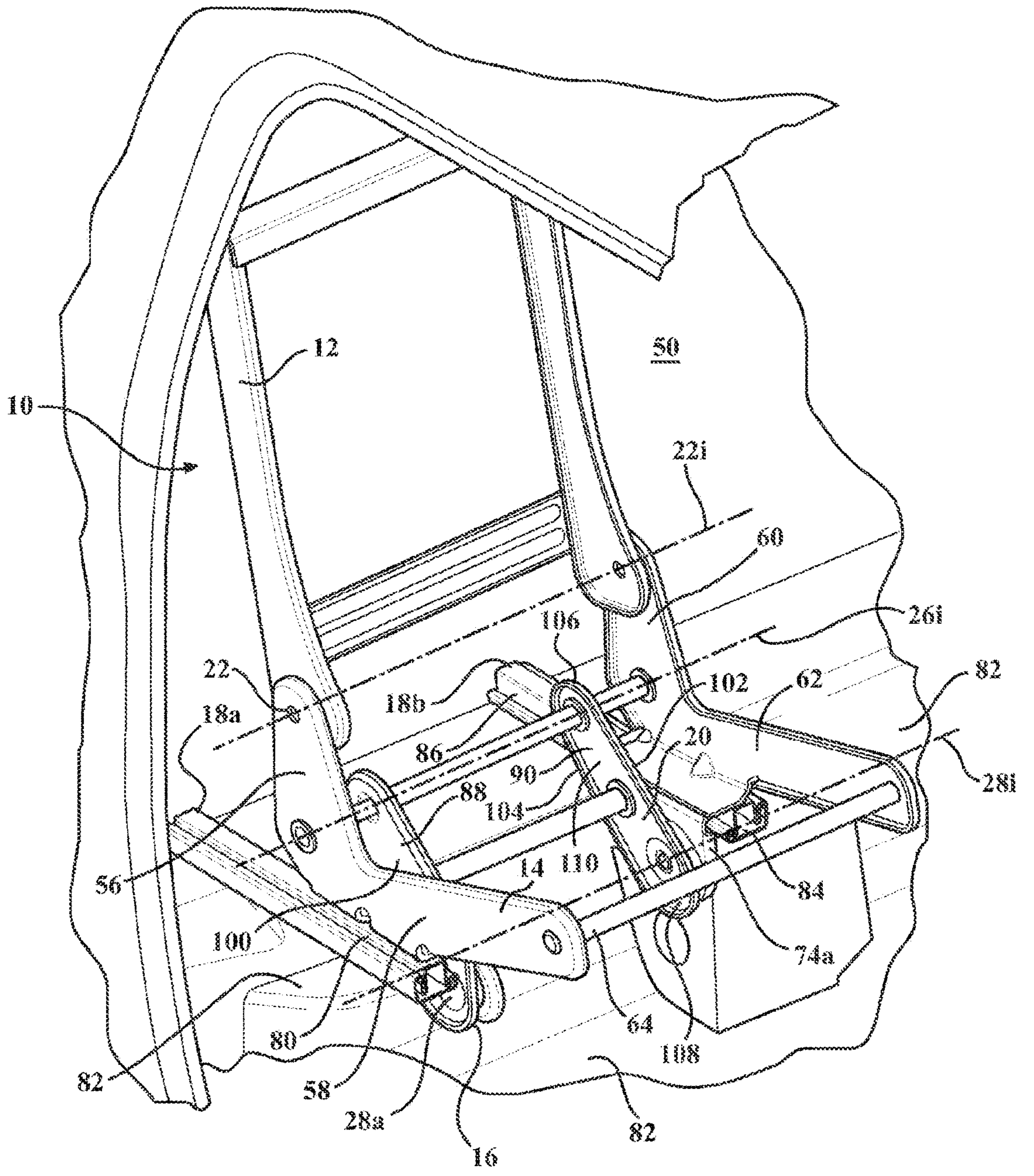
FIG. 8 is perspective view of the seat assembly in the use position within the vehicle cabin.
Figure 10B:
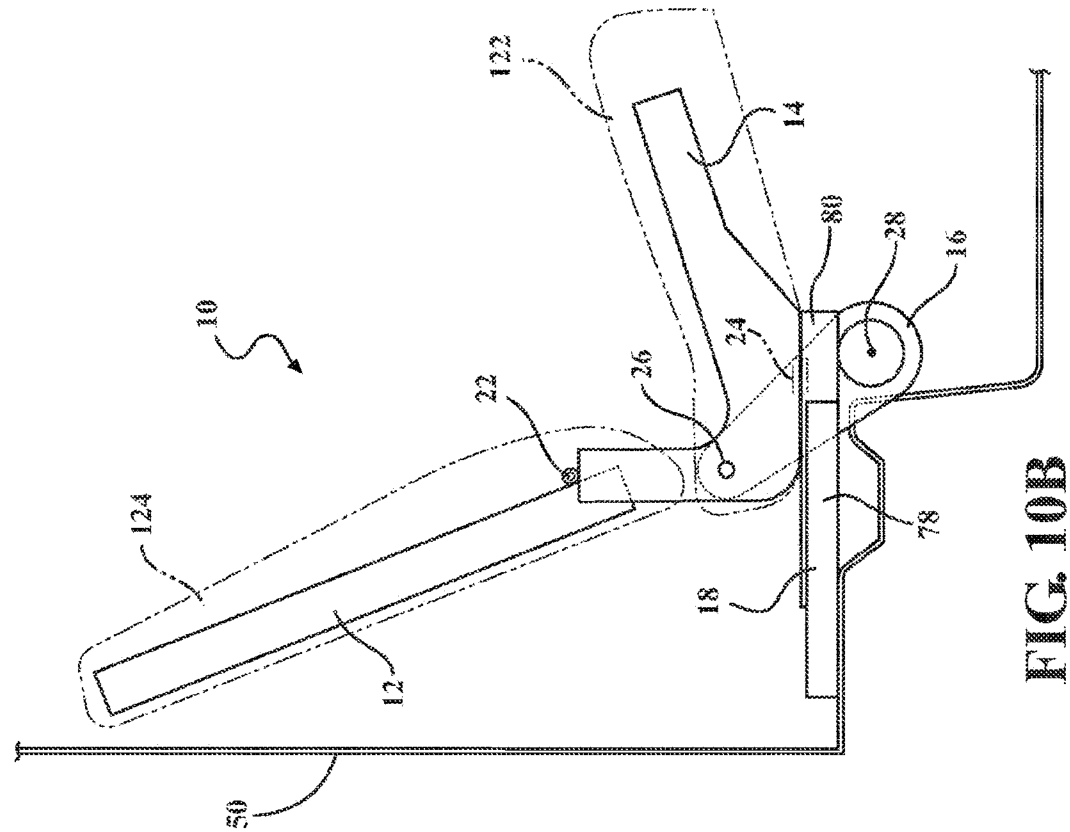
FIGS. 10A-10B are side views of the seat assembly transitioning from the use position to the recline/slouch position within the vehicle cabin.
Figure 10A:
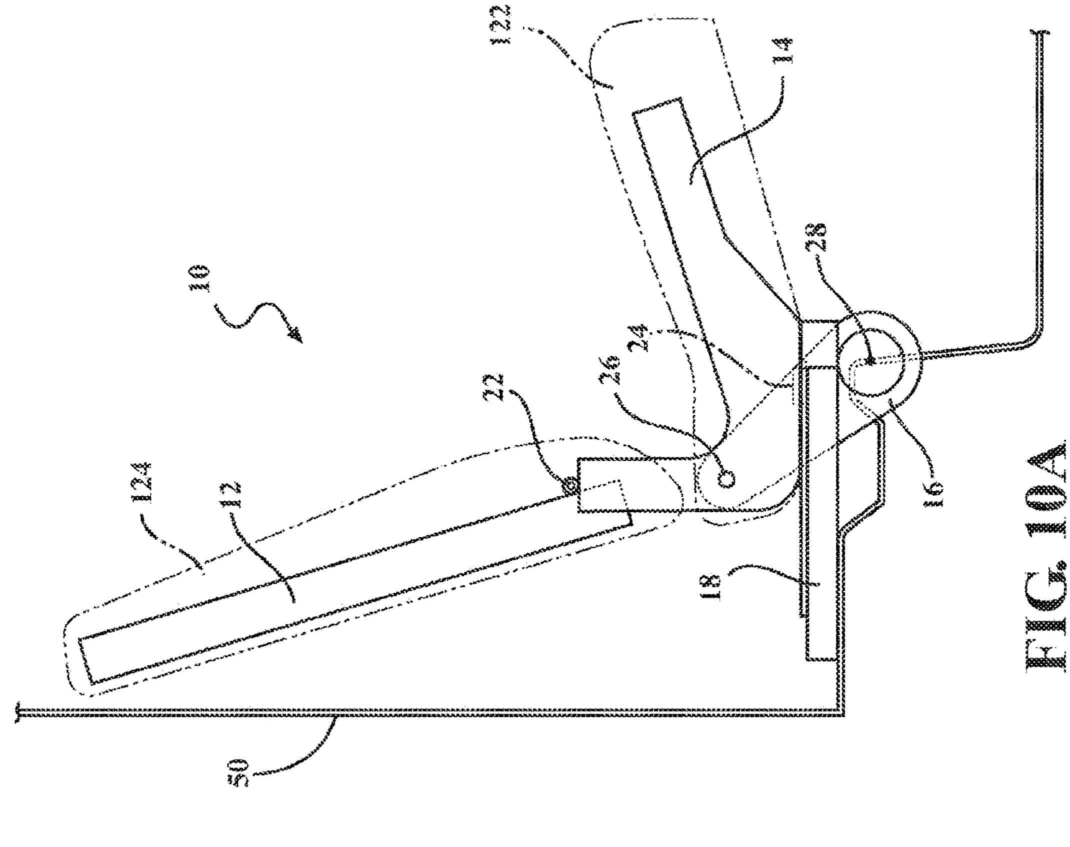

Referring to FIGS. 5, 7, and 8, there are two fore/aft adjusters 18*a*, 18*b* that run generally parallel with each other. Standard fore/aft seat adjusters that are commonly known in the art can be utilized. Referring to FIGS. 6 and 8, the first fore/aft adjuster 18*a* has a lower channel 78 that is adapted to be fixedly coupled to a vehicle floor 82 and an upper channel 80 that is slidably coupled to the lower channel 78. Referring to FIGS. 7 and 8, similarly, the second fore/aft adjuster 18*b* has a lower channel 84 that is adapted to be fixedly coupled to a vehicle floor 82 and an upper channel 86 that is slidably coupled to the lower channel 84. Both of the upper channels 80, 86 slidingly move between a full-rear position and a full-forward position. Referring to FIGS. 1, 2, and 4, in the full-rear position, the upper channel 80 is fully retracted inwardly with respect to the lower channel 78 and rearwardly toward the rear wall 50. Referring to FIGS. 3 and 10B, in the full-forward position, the upper channel 80 is fully extended outwardly with respect to the lower channel 78 and forwardly away from the rear wall 50. The same configuration is applicable for the second fore/aft adjuster 18*b*.

Referring to FIG. 6, the first section 66 of the first pivot support bracket 16 is rigidly attached, or fixedly coupled, to the upper channel 80 of the first fore/aft adjuster 18*a* and, as a result, also slidably moves relative to the lower channel 78 of the first fore/aft adjuster 18*a*. Referring to FIG. 7, the first section 72 of the second pivot support bracket 17 is rigidly attached to the upper channel 86 of the second fore/aft adjuster 18*b* and, as a result, also slidably moves relative to the lower channel 84 of the second fore/aft adjuster 18*b*.

Referring to FIGS. 5 and 6, there is a stow to floor bracket 20. The stow to floor bracket 20 includes a first side member 88 and a second side member 90 that are rigidly attached to each other by a connection member 92. The first side member 88 and the second side member 90 are positioned parallel with each other and are mirror images. Referring to FIG. 6, the first side member 88 has a cross section with a first edge 94 and a second edge 96 that are parallel with each other, an upper end 30 that is rounded extending outwardly between the first edge 94 and the second edge 96, and a lower end 32 that is rounded extending outwardly between the first edge 94 and the second edge 96. There is an inside surface 98 and an outside surface 100 (shown in FIG. 8) that are each defined by the boundaries of the first edge 94, the upper end 30, the second edge 96, and the lower end 32. Similarly, referring to FIG. 8, the second side member 90 has a cross section with a first edge 102 and a second edge 104 that are parallel with each other, an upper end 106 that is rounded extending outwardly between the first edge 102 and the second edge 104, and a lower end 108 that is rounded extending outwardly between the first edge 102 and the second edge 104. For the second side member 90, there is also an inside surface 110 and an outside surface 112 (shown in FIG. 5) that are each defined by the boundaries of the first edge 102, the upper end 106, the second edge 104, and the lower end 108. The connection member 92 is rigidly attached to the inside surface 98 of the first side member 88 and to the inside surface 110 of the second side member 90 near the center of the first side member 88 and the center of the second side member 90.

Referring to FIGS. 5-8, the stow to floor bracket 20 is pivotally coupled to the pivot support brackets 16, 17 near the lower end 32 of the first side member 88 and the lower end 108 of the second side member 90. The outside surface 100 of the first side member 88 of the stow to floor bracket 20 is positioned adjacent to the inside surface 68*a* of the vertical second section 68 of the first pivot support bracket 16. The first side member 88 of the stow to floor bracket 20 and the first pivot support bracket 16 are pivotally coupled together at the first stow pivot point 28*a*. The outside surface 112 of the second side member 90 of the stow to floor bracket 20 is positioned adjacent to the inside surface 74*a* of the vertical second section 74 of the second pivot support bracket 17 (shown in FIGS. 5, 7, and 8). The second side member 90 of the stow to floor bracket 20 and the second pivot support bracket 17 are pivotally coupled together at a second stow pivot point 28*b*. The first stow pivot point 28*a* and the second stow pivot point 28*b* are aligned with each other and define a stow pivot axis 28*i* (shown in FIGS. 5 and 7). The stow pivot 28 can be a free pivot, a latched pivot, a disc recliner pivot, or a power mechanism, all as known in the art.

The stow to floor bracket 20 is also pivotally coupled to the cushion frame 14 near the upper end 30 of the first side member 88 and the upper end 106 of the second side member 90 by a stadium pivot 26. The stadium pivot 26 includes an extension member 114 that has a first end 114*a* and a second end 114*b*. The first end 114*a* of the extension member 114 is pivotally coupled to the shorter first section 56 of the first member 52 of the cushion frame 14, then extends through an aperture 116 near the upper end 30 of the first side member 88 of the stow to floor bracket 20 and through an aperture 118 near the upper end 106 of the second side member 90 of the stow to floor bracket 20 and the second end 114*b* of the extension member 114 is pivotally coupled to the shorter first section 60 of the second member 54 of the cushion frame 14. A stadium pivot axis 26*i* is defined by an axial centerline of the extension member 114. The stadium pivot 26 can be a free pivot, a latched pivot, a disc recliner pivot, or a power mechanism, all as known in the art.

The stow pivot axis 28*i*, which is the axis about which the stow to floor bracket 20 rotates relative to the pivot support brackets 16, 17, is spaced vertically below the upper channels 80, 86 of the fore/aft adjusters 18*a*, 18*b*.

Figure 9A:
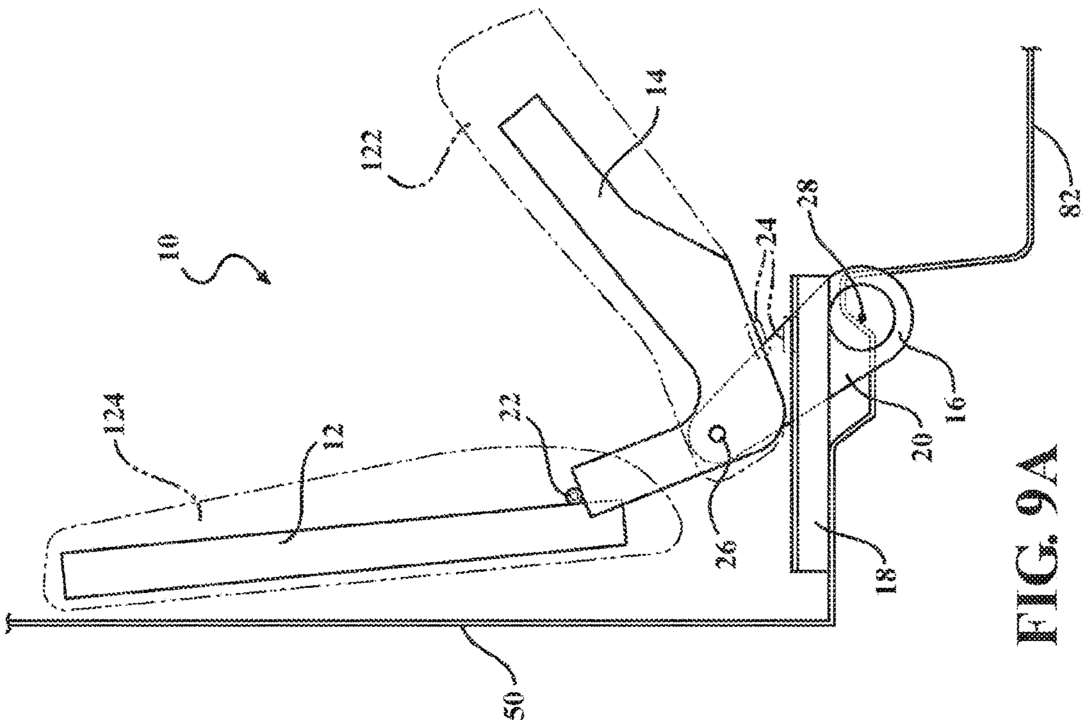
FIGS. 9A-9C are side views of the seat assembly transitioning from the use position to the stadium position within the vehicle cabin.
Figure 9:
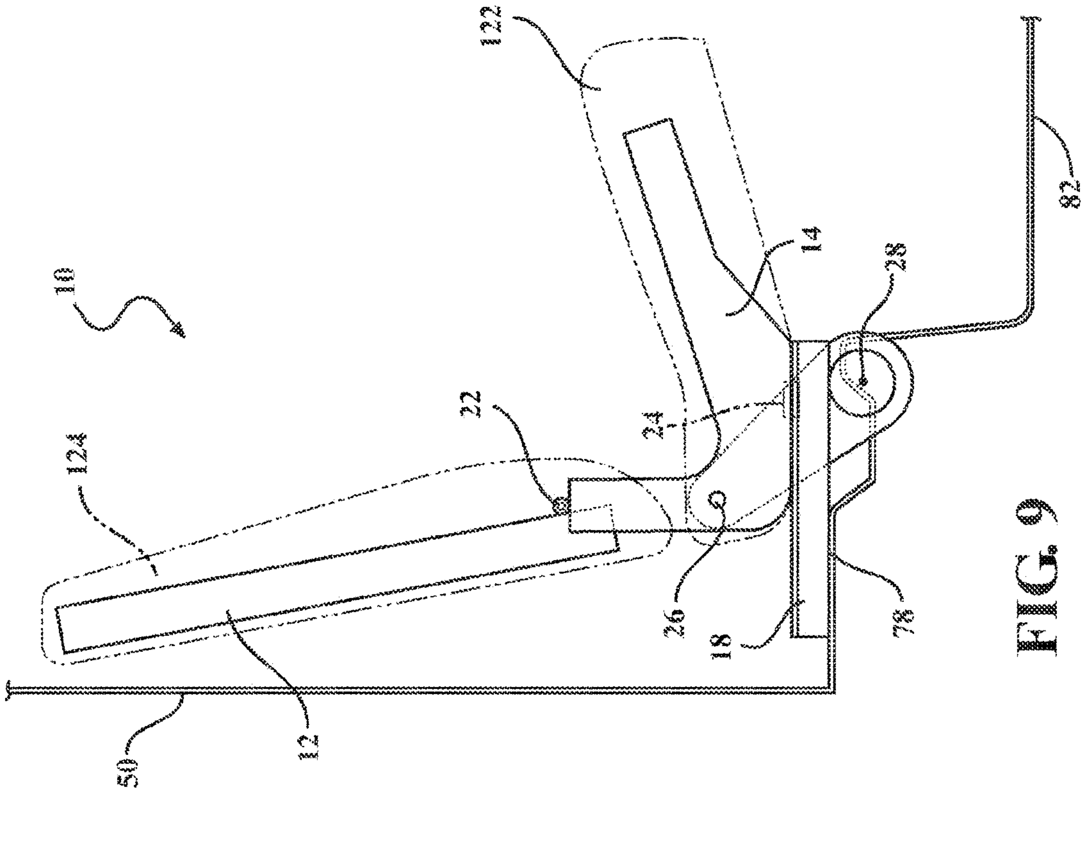
FIG. 9 is a side view of the seat assembly in the use position within the vehicle cabin.

In operation, FIGS. 1, 5, and 9 illustrate the vehicle seat assembly 10 in the use position. When in the use position, the seat cushion 11 is generally horizontally oriented, the seat back 13 is generally vertically oriented in an upright position with respect to the seat cushion 11 and an optional latch 24 couples the seat cushion 11 with the pivot support bracket 16. More specifically, the cushion frame 14 is optionally latched together with the pivot support brackets 16, 17 by latch 24. The fore/aft adjusters 18*a*, 18*b* are fully retracted to the full-rear position. The back angle of the back frame 12 is 12° measured from an imaginary vertical line 120. The upper ends 30, 106 of the first side member 88 and the second side member 90 of the stow to floor bracket 20 are locked into position with the upper ends 30, 106 tilted rearwardly and the lower ends 32, 108 tilted downwardly and forwardly with respect to the upper ends 30, 106. The cushion frame 14 is positioned with the shorter first sections 56, 60 generally upwardly or vertically oriented and the longer second sections 58, 62 generally horizontally oriented. Referring to FIG. 7, the recline pivot axis 22*i* is spaced vertically above the stadium pivot axis 26*i* and the stadium pivot axis 26*i* is spaced vertically above the stow pivot axis 28*i*. As mentioned previously, the stow pivot axis 28*i* of rotation is spaced vertically below the upper channels 80, 86 of the fore/aft adjusters 18*a*, 18*b*.

Figure 9C:
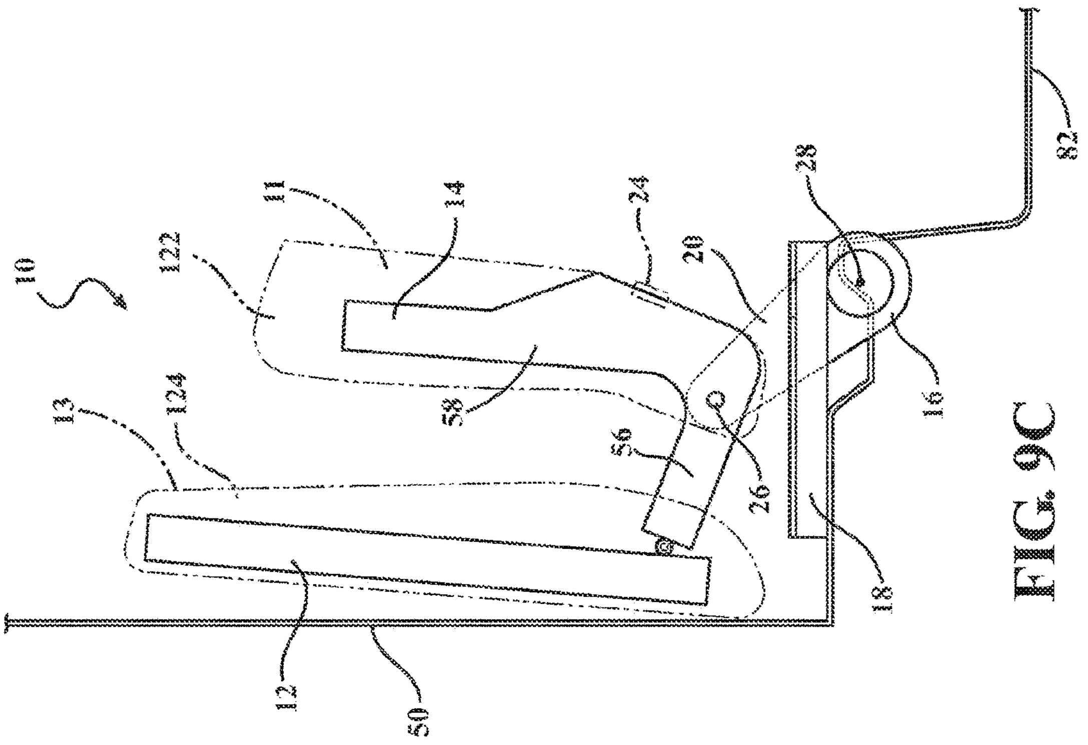
Figure 9B:
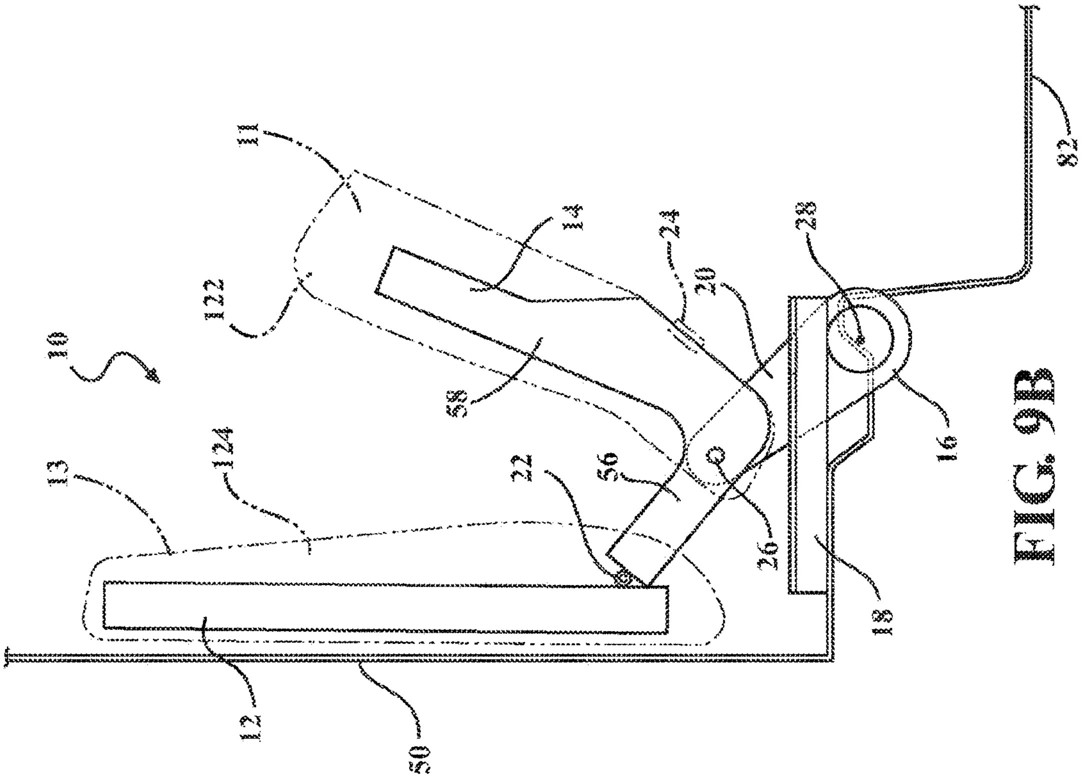

Referring to FIGS. 2 and 9C, when the vehicle seat assembly 10 is in a stadium position, the upper channels 80, 86 of the fore/aft adjusters 18*a*, 18*b* are in the full-rear position, the seat cushion 11 is disengaged from the pivot support brackets 16, 17 and is in a folded position about the stadium pivot 26 with respect to the seat back 13, and the seat cushion 11 and the seat back 13 are both oriented generally vertically and upwardly, with the seat back 13 adjacent to a rear wall 50 of the cabin. More specifically, referring to FIGS. 1, 2, 9, and 9*a*-9*c*, to reposition the vehicle seat assembly 10 from the use position (shown in FIG. 1) to the stadium position (shown in FIG. 2), the optional latch 24 is released decoupling the cushion frame 14 from the pivot support brackets 16, 17. Next, referring to FIG. 9A-9C, the cushion frame 14 is rotated upwardly about the stadium pivot 26. The upward rotation of the cushion frame 14 causes the back frame 12 to rotate around the recline pivot 22 and slide downwardly along the rear wall 50 of the cabin, repositioning the vehicle seat assembly 10 into the stadium position (shown in FIGS. 2 and 9C). The cushion frame 14 locks in place in an upward or vertical position when the longer second sections 58, 62 of the cushion frame 14 are in a generally vertical position and the shorter first sections 56, 60 are in a generally horizontal position. The back frame 12 and the longer second sections 58, 62 of the cushion frame 14 are generally parallel with each other.

When the seat is released from the stadium position it transitions back to the use position (shown in FIG. 1). The longer second sections 58, 62 of the cushion frame 14 rotate forwardly and downwardly about the stadium pivot 26 until it re-engages with the pivot support brackets 16, 17. This motion causes the back frame 12 to move vertically upward relative to the rear wall 50 of the cabin. Further, the re-engagement of the cushion frame 14 with the pivot support brackets 16, 17 causes the longer second sections 58, 62 of the cushion frame to rotate back to their generally horizontal position and the shorter first sections 56, 60 to rotate back to their generally vertical position.

Referring to FIG. 3, when the vehicle seat assembly 10 is in a recline position, the upper channels 80, 86 of the fore/aft adjusters 18*a*, 18*b* are in the full-forward position and the seat back 13 is pivoted rearwardly about the recline pivot 22 to a recline position. More specifically, referring to FIGS. 1, 3, and 10A-10B, to reposition the vehicle seat assembly 10 from the use position (shown in FIG. 1) to the recline/slouch position (shown in FIG. 3), the pivot support brackets 16, 17 are transposed along with the upper channels 80, 86 of the fore/aft adjusters 18*a*, 18*b* in a forward direction and the back frame 12 is rotated rearwardly around the recline pivot 22. The seat assembly 10 locks into this position. This position provides more flexibility for an occupant to maximize their comfort.

When the seat assembly 10 is released from the recline/slouch position, the pivot support brackets 16, 17 are transposed along with the upper channels 80, 86 of the fore/aft adjusters 18*a*, 18*b* in a rearward direction and the back frame 12 is rotated forwardly about the recline pivot 22 and locks back in the use position.

Figure 11A:
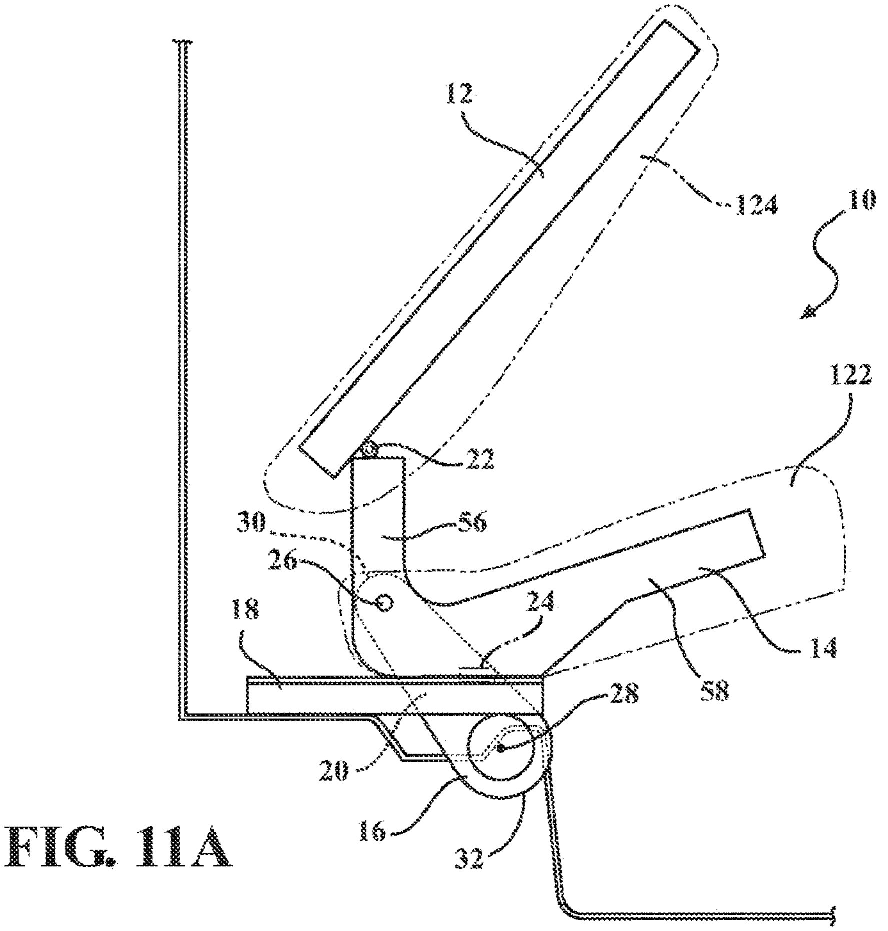
FIGS. 11A-11D are side views of the seat assembly transitioning from the use position to the stow to floor position within the vehicle cabin.
Figure 11B:
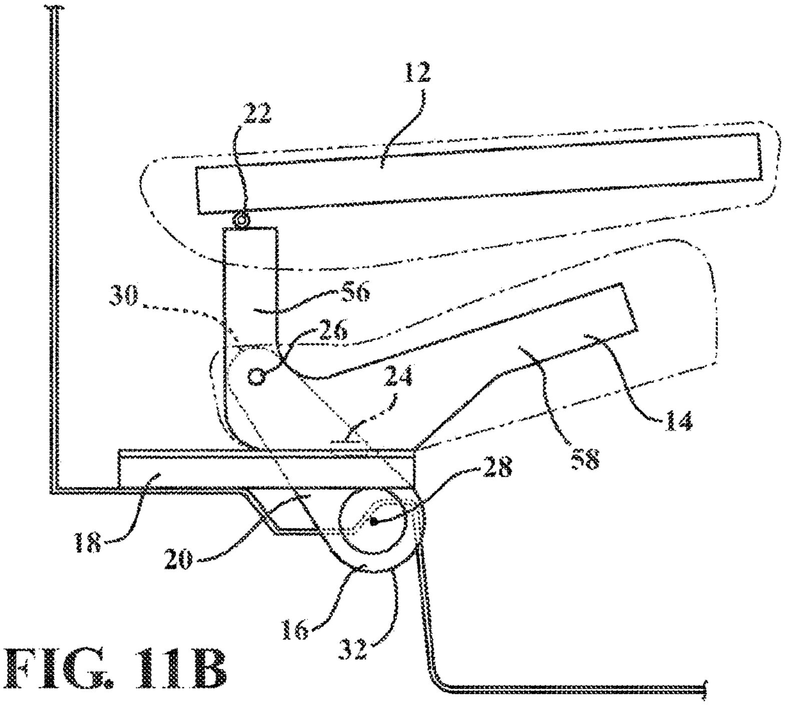
Figure 11C:
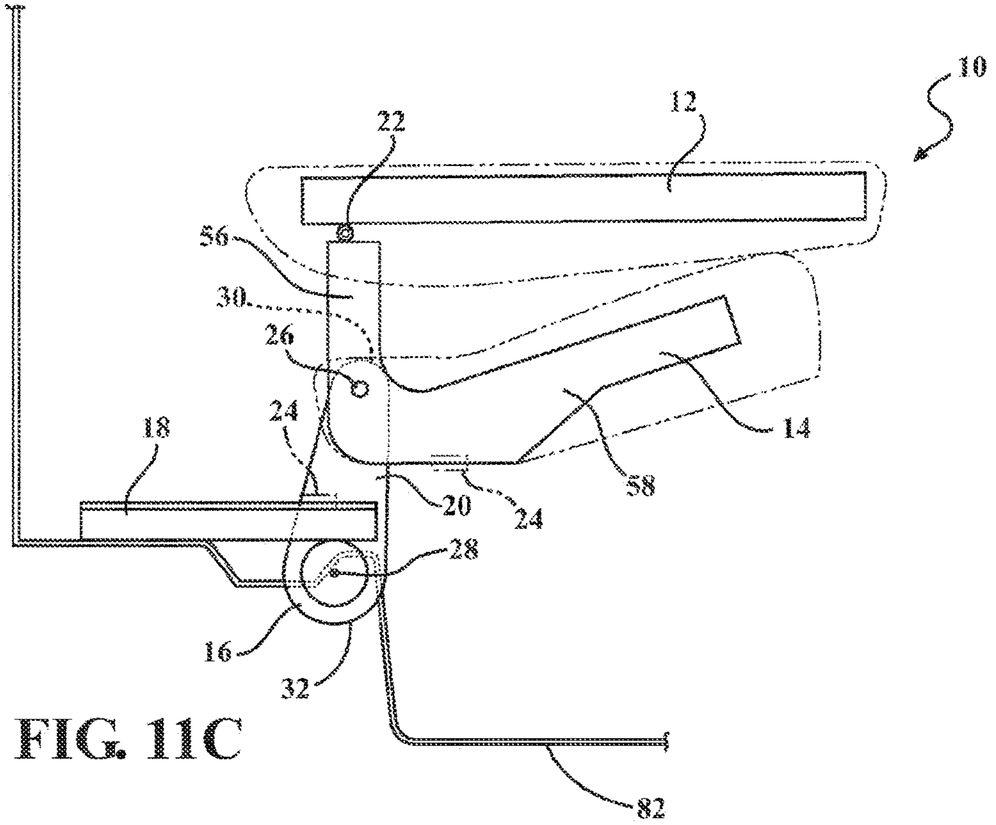
Figure 11D:
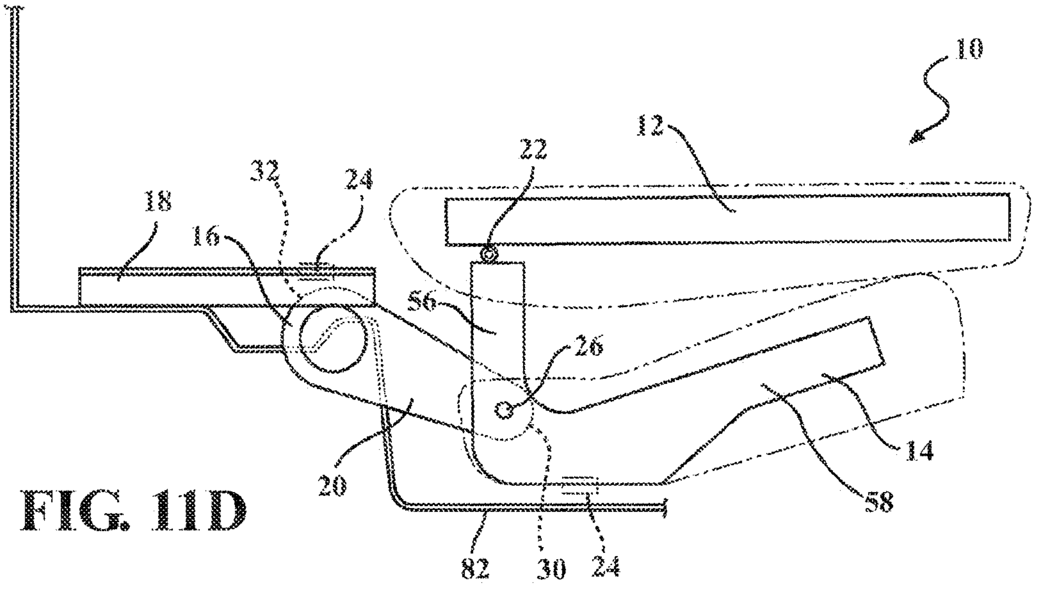

Referring to FIGS. 4 and 11D, when the vehicle seat assembly is in a stow to floor position the upper channels 80, 86 of the fore/aft adjusters 18*a*, 18*b* are in the full-rear position, the seat cushion 11 is disengaged from the pivot support brackets 16, 17 and is in a stowed position through rotations about the stadium pivot 26 and the stow pivot 28, the seat back is in a folded position through rotation about the recline pivot 22, and the seat cushion 11 and the seat back 13 are both oriented generally horizontally, with the seat cushion 11 adjacent to the vehicle floor 82 and the seat back 13 positioned vertically above the seat cushion 11. The stadium pivot 26 is positioned forwardly with respect to the stow pivot 28. Further, the stadium pivot 26 is spaced vertically beneath the stow pivot 28. More specifically, referring to FIGS. 1, 4 and 11A-11D, to reposition the vehicle seat assembly 10 from the use position (shown in FIG. 1) to the stow to floor position (shown in FIGS. 4 and 11D), the fore/aft adjusters 18*a*, 18*b* are at the full-rear position. The latch 24 is released decoupling the cushion frame 14 from the pivot support brackets 16, 17. Referring to FIG. 11A, the back frame 12 rotates forwardly and downwardly towards the cushion frame 14 about the recline pivot 22. Referring to FIG. 11B, the back frame 12 folds over forwardly and collapses relative to the longer second sections 58, 62 of the cushion frame 14. Referring to FIG. 11C, the upper ends 30, 106 of the first and second side members 88, 90 of the stow to floor bracket 20, to which the cushion frame 14 is pivotally attached at the stadium pivot 26, continue to rotate forwardly around the stow pivot 28 traveling through a generally vertical position and continues to rotate forwardly and downwardly until the cushion frame 14 rests on the vehicle floor 82 along with the folded back frame 12 resting on it vertically above, resulting in repositioning the vehicle seat assembly 10 to the stow to the floor position (shown in FIGS. 4 and 11D). In this position, the upper ends 30, 106 of the first and second side members 88, 90 of the stow to floor bracket 20 are positioned angled forwardly and downwardly relative to the lower ends 32, 108 of the first and second side members 88, 90 of the stow to floor bracket 20.

Counterbalance springs and/or linkages may be used to control the motion of the cushion frame 14 and support the weight of the seat assembly 10 throughout its travel. Further, depending on the positioning of the fore/aft adjusters 18*a*, 18*b* relative to the vehicle floor 82 and the geometry and depth of the floor well, the back frame 12 that is folded over the cushion frame 14 could be positioned vertically above, even with, or below the vertical position of the fore/aft adjusters 18*a*, 18*b*. This positioning would provide a maximum amount of vertical storage space measured from the top surface of the folded seat back 13 and the ceiling of the cabin.

To reposition the vehicle seat assembly 10 from the stow to floor position (shown in FIG. 4) back to the use position (shown in FIG. 1), the upper ends 30, 106 of the first and second side members 88, 90 of the stow to floor bracket 20 rotate about the stow pivot 28 upwardly and rearwardly, through a generally vertical position, until the cushion frame 14 re-engages with the pivot support brackets 16, 17 and the upper ends 30, 106 of the first and second side members 88, 90 of the stow to floor bracket 20 are positioned generally rearwardly and upwardly relative to the lower ends 32, 108 of the first and second side members 88, 90. The back frame 12 rotates upwardly and rearwardly about the recline pivot 22 until it reaches the upright use position.

In a second embodiment, the seat assembly 10 is a freestanding seat. In this embodiment, a disc recliner is positioned at the recline pivot 22 and the seat assembly 10 incorporates an automatic coupling device at the top of the back frame 12 to allow a stadium position. The coupling device could be a simple slot and tab feature or other commonly known latching devices, for example as shown in U.S. Pat. No. 8,662,561.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

The invention claimed is:

1. A seat assembly for use in an automotive vehicle comprising:
- a seat cushion;
- a seat back pivotally coupled to the seat cushion by a recline pivot;
- a fore/aft adjuster having a lower channel adapted to be fixedly coupled to a floor of the automotive vehicle and an upper channel slidably coupled to the lower channel;
- a pivot support bracket fixedly coupled to the upper channel;
- a stow to floor bracket having a lower end pivotally coupled to the pivot support bracket by a stow pivot and an upper end pivotally coupled to the seat cushion by a stadium pivot; and
- wherein the stow pivot defines a stow pivot axis that is spaced vertically below the upper channel of the fore/aft adjuster.

2. The seat assembly as set forth in claim 1, wherein in a use position of the seat assembly:
- the seat cushion is generally horizontally oriented; and
- the seat back is generally vertically oriented in an upright position with respect to the seat cushion.

3. The seat assembly as set forth in claim 2, wherein in the use position of the seat assembly:
- a recline pivot axis is an axis of rotation defined by the recline pivot;
- a stadium pivot axis is an axis of rotation defined by the stadium pivot; and
- wherein the recline pivot axis is spaced vertically above the stadium pivot axis and the stadium pivot axis is spaced vertically above the stow pivot axis.

4. The seat assembly as set forth in claim 1, wherein in a stadium position of the seat assembly:
- the upper channel of the fore/aft adjuster is in the full-rear position, wherein a full-rear position is when the upper channel is fully retracted with respect to the lower channel;
- the seat cushion is pivoted about the stadium pivot to a folded position parallel and adjacent the seat back; and
- the seat cushion and the seat back are both oriented generally vertically and upwardly, with the seat back adjacent to a rear wall of the vehicle.

5. The seat assembly as set forth in claim 1, wherein in a recline position of the seat assembly:
- the upper channel of the fore/aft adjuster is in a full-forward position, wherein a full-forward position is when the upper channel is fully extended with respect to the lower channel; and
- the seat back is pivoted rearwardly about the recline pivot to a recline position.

6. The seat assembly as set forth in claim 1, wherein in a stow to floor position of the seat assembly:
- the upper channel of the fore/aft adjuster is in a full-rear position, wherein a full-rear position is when the upper channel is fully retracted with respect to the lower channel;
- the seat back is pivoted about the recliner pivot to a fold flat position overlying the seat cushion;
- the seat cushion and the seat back are both oriented generally horizontally; and
- the seat cushion is pivoted by the stow to floor bracket forwardly and downwardly about the stow pivot and stadium pivot adjacent the floor of the vehicle.

7. The seat assembly as set forth in claim 1, wherein in the stow to floor position of the seat assembly:
- the stadium pivot is positioned forwardly with respect to the stow pivot;
- a stadium pivot axis is an axis of rotation defined by the stadium pivot; and
- the stadium pivot axis is spaced vertically beneath the stow pivot axis.

8. The seat assembly as set forth in claim 1, wherein:
- the recline pivot is a free pivot, a latched pivot, a disc recliner pivot, or a power mechanism;
- the stadium pivot is a free pivot, a latched pivot, a disc recliner pivot, or a power mechanism; and
- the stow pivot is a free pivot, a latched pivot, a disc recliner pivot, or a power mechanism.

9. The seat assembly as set forth in claim 1, further comprising a high latch adapted to operatively couple the seat back to a rear interior wall of the vehicle.

10. The seat assembly as set forth in claim 1, further comprising a latch selectively engaging the seat cushion to the pivot support bracket.

* * * * *